United States Patent
Raz

Patent Number: 5,219,406
Date of Patent: Jun. 15, 1993

[54] VERSATILE MODULAR OFFICE PARTITIONS

[75] Inventor: Dan Raz, Haifa, Israel

[73] Assignee: Schwartz Bros. Wood & Metal Furnitures Ltd., Kiryat Ata, Israel

[21] Appl. No.: 812,481

[22] Filed: Dec. 23, 1991

[51] Int. Cl.⁵ .............................................. A47G 5/00
[52] U.S. Cl. .................................... 160/135; 52/239; 403/252; 403/262; 403/391
[58] Field of Search .................. 160/135, 351, 371; 40/605, 606, 610; 52/239, 821; 403/391, 389, 396, 252, 256, 262

[56] References Cited

U.S. PATENT DOCUMENTS

| | | | |
|---|---|---|---|
| 3,017,969 | 1/1962 | Nielsen | 52/239 |
| 3,583,466 | 6/1971 | Dreyer | 160/351 |
| 3,875,711 | 4/1975 | Palmer | 52/239 |
| 4,085,789 | 4/1978 | Steiner et al. | 160/351 X |
| 4,100,709 | 7/1978 | Good | 160/351 X |
| 4,468,067 | 8/1984 | Jenkins | 403/252 X |
| 4,597,140 | 7/1986 | Girard | 403/391 X |
| 4,597,690 | 7/1986 | Girard | 403/391 |

*Primary Examiner*—David M. Purol
*Attorney, Agent, or Firm*—Mark M. Friedman

[57] ABSTRACT

A framework for a space partition of the type used in dividing up an open space into individual offices which can be easily made of any desirable dimensions. The framework is made up of a pair of vertical members and a cross member connecting the vertical members. The cross member is, in turn, made up of a pair of connectors, each of which can engage one of the vertical members and which are connected to each other by a rod which is cut to a precise length so as to create a framework of a desired size.

13 Claims, 7 Drawing Sheets

VERSATILE MODULAR OFFICE PARTITIONS

FIELD AND BACKGROUND OF THE INVENTION

The present invention relates to modular open space office partitions of variable adjustable modular dimensions and, more particularly, to a detachable framework for supporting panels such as those typically used in offices to partition a large space into separate office units, which can be conveniently made to have any desired dimensions.

Modern office buildings are often built to include large open spaces which are subsequently subdivided into a number of office units of various sizes and shapes to fit the desire of the users. The partitioning of large spaces into individual office units is typically accomplished by the use of space partitions of various types.

Typically these partitions take the form of a series of modular units which can be interconnected with each other to form the desired enclosed spaces. Each partitioning unit is typically made up of a rigid welded metal frame of some standard span and height. The word 'span' is used throughout to unambiguously indicate the distance between the two upright members of each modular unit. The use of the word 'width', which could variously signify either the span, as defined above, or the thickness of the module measured from front to back, is thus avoided.

The frame is typically covered on both sides with decorative panels made, for example, of fabric, wood, glass, etc. and, in some cases, containing acoustic material to create an acoustic barrier to cut down on sound transmission between offices. The space between the front and back decorative panels defines a cavity in which various electrical, telephone, computer, communication and other wires can be located.

The individual modules are made so that they can easily be connected to adjoining modules to form the complete partition. Installation of the system involves connecting the rigid metal frames to each other to form the desired configuration, the passing of the various electrical, phone and computer lines through the metal frames, and the covering of the front and back faces of each metal frame with decorative covering panels.

While the system is, in general, highly convenient to install, it suffers from a major disadvantage, namely, the modules are ordinarily available in only several standard spans and heights. This is because the metal frames forming the backbone of each module are typically constructed by welding four or more pieces of metal together to form a rigid monolithic structure.

To form a framework for supporting a space partition using presently known technology one normally permanently connects, as by welding, two vertical members and two or more horizontal members to form a rectangular structure onto which decorative panels can be installed to form the partition. For practical reasons relating to ease of mass manufacturing and inventory control, only a small number of standard sizes are manufactured by the various space partition manufacturers.

To accommodate non-standard space requirements, special modules must be fabricated at the manufacturing site. Such fabrication requires the welding of the vertical members and cross-members together to form a permanent structure. The various member welded to form a framework, must, of course, be capable of being welded to each other, which tends to greatly reduce the range of materials out of which the members may be made. For example, the use of plastic members, which may be otherwise desirable, may be precluded since they may be incapable of being welded to other materials.

Furthermore, transport of such structures from the manufacturing site to the installation location is costly and problematical, since the structures take up considerable space and since they can be bent or otherwise damaged during transport unless great care is taken.

The inflexibility resulting from the availability of only a limited number of standard module sizes gives rise to great difficulties in many cases. For example, where it is desired to create partitions in an odd-shaped space, or in a space which contains various fixed obstructions, such as weight-bearing structural columns. The problem also arises when it is desired to install partitions designed in, say, the metric system of measurements, in a space which was designed in, for example, inches and feet, and vice versa.

Presently when a mismatch is encountered between the space to be partitioned and the standard available module sizes, one of two basic solutions is used. One approach is to compromise either aesthetics or functionality, or both, and install the standard unit which will best fit the space. This often involves sacrificing the appearance and/or the usefulness of at least a portion of the partitioning system.

The other alternative is to custom-make non-standard metal frames to fit the available space. This second alternative is costly in terms of manpower and is highly disruptive of operations, requiring special design and special fabrication of the modules.

There is thus a widely recognized need for a modular office partition system which can be easily installed and which can take on standard or non-standard dimensions which will make it relatively easy to accommodate any space requirements, without the need to specially fabricate rigid metal frames.

It would be highly desirable to have a way of easily and quickly fabricating and installing a partitioning module which will have precisely the size desired. Specifically, there is a clear need for, and it would be highly advantageous to have, a way of fabricating a custom-made partitioning module which does not involve the fabrication of a rigid metal frame of specific and unalterable dimensions.

SUMMARY OF THE INVENTION

According to the present invention there is provided a space partition framework, comprising: a pair of vertical members; and a cross member connecting the vertical members, the cross member including: a pair of connectors, each of the connectors capable of engaging one of the vertical members; and a linking element connecting the connectors to each other.

According to further features in preferred embodiments of the invention described below, the linking element may be a rod or a tube, typically of metal. Preferably the linking element will include two parallel cylindrical rods detachably connected to the connectors with a space between them to accommodate electrical, telephone, communication and computer wires.

According to still further features in the described preferred embodiments, each of the vertical members, typically of aluminum profile, features a series of openings into which can fit projections located on the outwardly directed surface of the connectors so as to facilitate the detachable connection of the vertical members. Each connector, which may typically be made of plastic or metal, may be made up of two segments which can be fastened to each other, e.g. by one or more screws, so as to confine the linking element between them.

The present invention successfully addresses the shortcomings of the presently known configurations by providing a framework for space partitions which can quickly and inexpensively be customized for any desired dimensions and which will obviate the need to fabricate permanent and cumbersome rigid welded frames.

The framework according to the present invention can be quickly assembled on-site using a small number of components, most of which are standard. The framework module is assembled from a pair of vertical members which may be of any desired height, including standard heights.

The distance between adjoining vertical members, or the span of the module, is determined by the length of the cross member made of cylindrical rods or tubes which can be cut on-site, or which can be precut at the manufacturing facility, to any desired length. The rods or tube are readily fastened at each end to the connector. Each connector is then easily attached to one of the vertical members. Any number of such rod and connectors sets may be used to connect the two vertical members to form a framework of the desired size.

Once the framework has been assembled, the installation of the partition can generally proceed with the placement of the various electrical, telephone and communication wires within the framework. The installation is completed with the attachment of one or more decorative and/or acoustic panels onto the framework to conceal the wiring and give the partition an aesthetically pleasing appearance and/or sound absorbing qualities.

In contrast with the presently known frameworks, a framework according to the present invention is formed by detachably connecting, usually on site, the two vertical members to each other using one or more, preferably two or more, cross members designed so that they can easily be made to have any desired length so as to give the structure any span desired by the user.

The preparation of the various elements needed to assemble the framework is done at the manufacturing site and the unassembled components are easily transported to the installation site where they are easily and quickly assembled into the final structure. The inherent convenience of this approach eliminates the need for inventorying and transporting of large and delicate structures and makes it possible to safely transport a large number of unassembled components over large distances for on-site assembly.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a modular framework for space partitions which can be readily made to be of any desired size so as to accommodate standard and non-standard space requirements. Specifically, the present invention can be used to easily custom-make space partitions of any desired dimensions without requiring the fabrication of rigid and permanent welded frames as is the case with presently known technology.

The operation and principles of the framework according to the present invention can be better understood with reference to the drawings, which are illustrative only, and which demonstrate examples of various aspects of embodiments of a framework according to the present invention.

Figure 1:
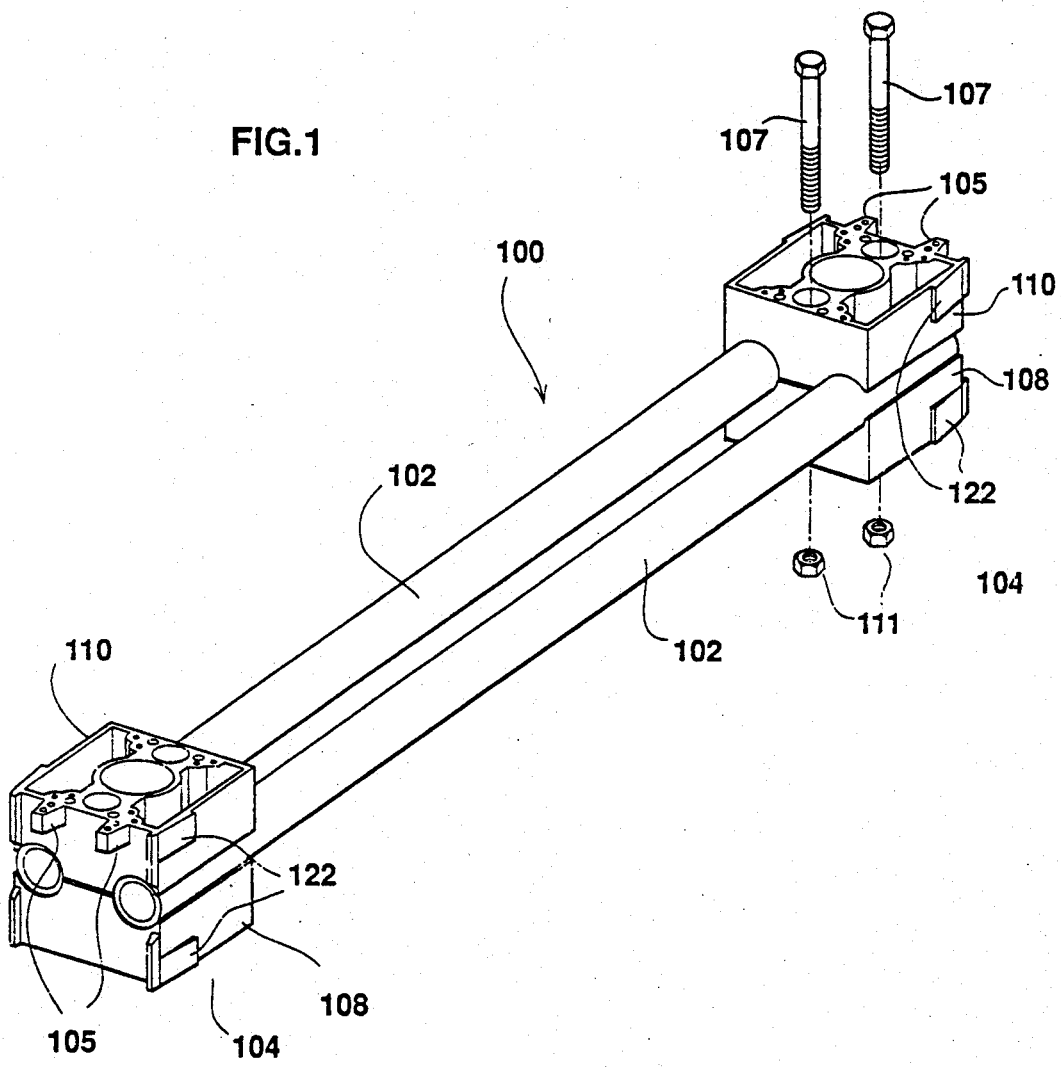
FIG. 1 is a perspective view of a cross member for use in forming a framework according to the present invention.
Figure 2:
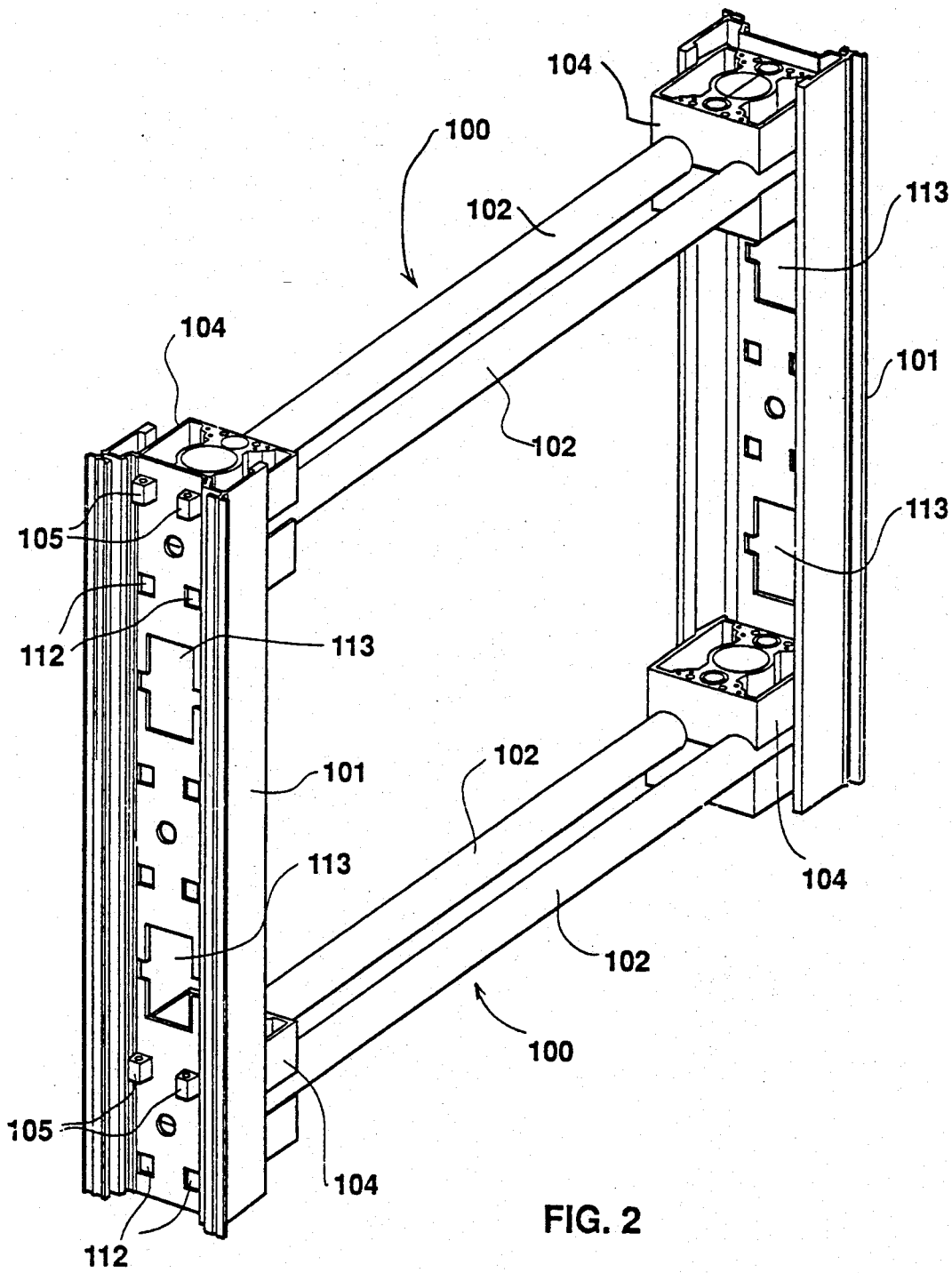
FIG. 2 is a perspective view of a framework according to the present invention.

Referring now to the drawings, FIG. 1 illustrates a cross member, designated generally as 100. As can be seen in FIG. 2, cross member 100 is used to connect a pair of vertical members 101. Cross member 100 may be constructed in a variety of forms and shapes, but typically includes at least one linking element, such as a bar or cylindrical tube or rod 102 (hereinafter referred to generally as rod), and connectors 104 at each end of rod 102.

Figure 3:
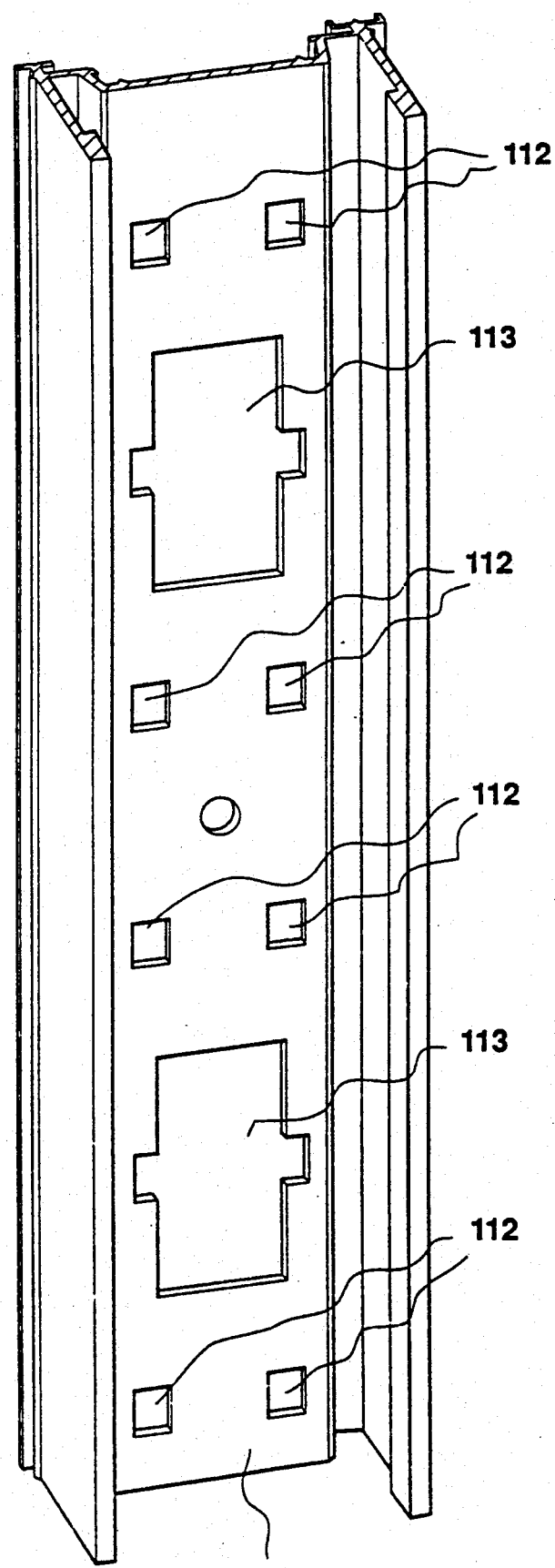
FIG. 3 is a perspective view of a vertical member.

Connector 104 is adapted to accept and hold rod 102 and to securely engage one of vertical members 101, preferably with the aid of one or more prongs 105. FIG. 3 shows vertical member 101 to feature a series of slits 112 running along the length of vertical member 101 and capable of accepting prongs 105.

Vertical member 101 also features one or more wire holes 113 for accommodating the various electrical, telephone, computer, communication and other wires and various associated plugs and sockets which are normally included within or must be passed through a space partition.

Rod 102 is cut prior to its insertion into connectors 104 to a length which, when cross member 100 is fully installed, will form a framework of precisely the desired span.

To ensure that the precise span desired is obtained, rod 102 preferably features a pair of holes (not shown) near each of its ends into which one or more projections 116 of connector 104 can fit so as to precisely fix the location of rod 102.

Preferably a pair of parallel rods 102 is used as the linking element. The two rods 102 are preferably separated by a sufficient distance to allow various electrical, phone and computer wires, including their various associated plugs and sockets, to pass easily between rods 102 during the installation of the space partition.

Connector 104 is preferably made up of two opposing pieces which, for convenience will be termed a lower connector 108 and an upper connector 110, although upon installation, upper connector 110 may, if desired, be installed below lower connector 108. Lower connector 108 and upper connector 110 may be connected to each other by any convenient means, such as by means of one or more bolts 107 and nuts 111 or by similar fasteners. Preferably the connection between lower connector 108 and upper connector 110 is detachable, as is the connection with rods 102. Lower connector 108 and upper connector 110 are configured so that when they are connected to each other they also firmly hold and retain rods 102.

Figure 4:
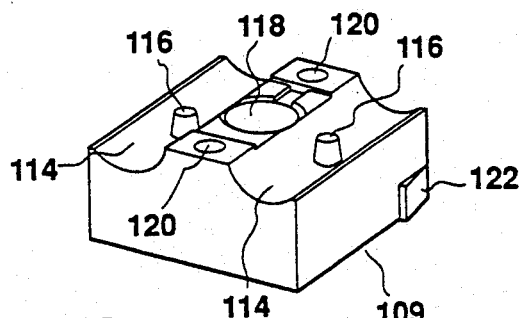
FIG. 4 is a perspective view of the inner portion of a connector piece.
Figure 5:
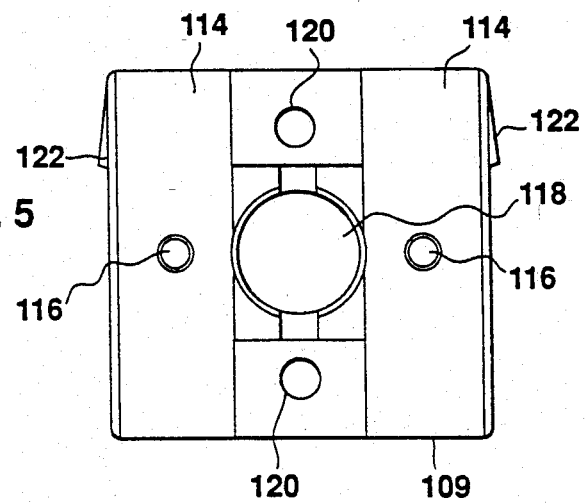
FIG. 5 is a plan view of the inner portion of a connector piece.
Figure 6:
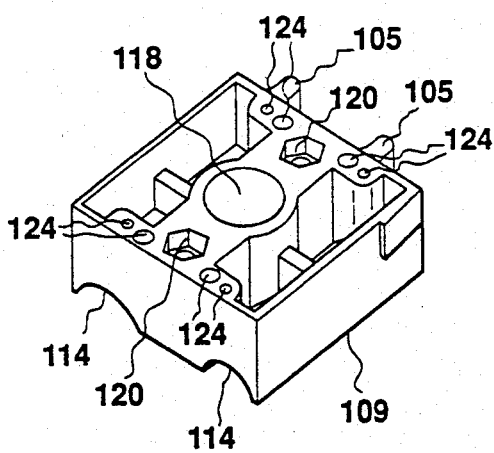
FIG. 6 is a perspective view of the outer portion of a connector piece.
Figure 7:
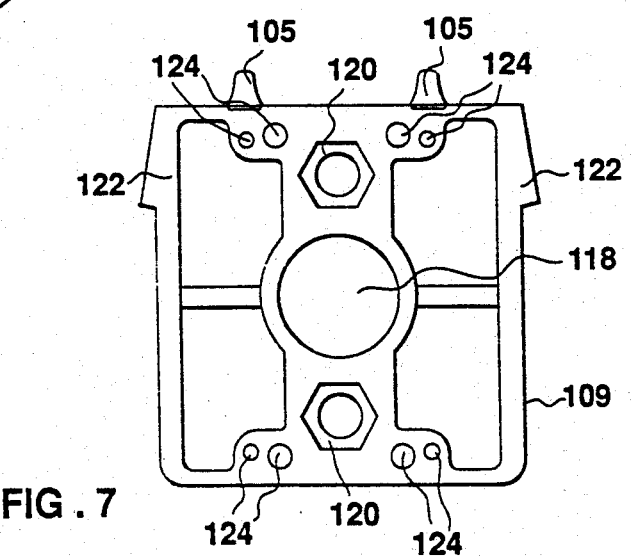
FIG. 7 is a plan view of the outer portion of a connector piece.
Figure 8:
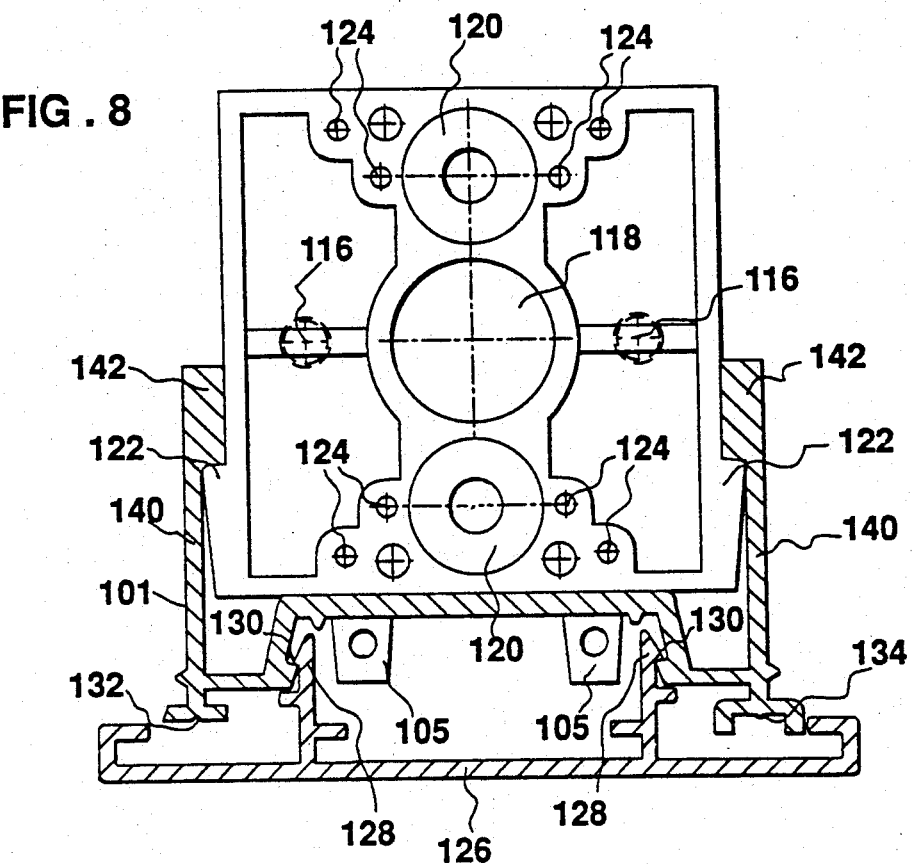
FIG. 8 is a cross sectional view of a vertical member, a covering plate and a connector.

Connector 104 may be constructed in a wide variety of configurations. Preferably, connector 104 is made up of two opposing pieces (lower connector 108 and upper connector 110) which are identical or nearly identical to each other. The generic connector piece will, for convenience, be generally designated 109. One configuration of connector piece 109 is shown in more detail in FIGS. 4-7. FIG. 4 is a perspective view, and FIG. 5 is a plan view showing some of the details of the inner surface of the connector piece, i.e., the side of connector piece 109 facing the complementary connector piece, while FIGS. 6 and 7 are the corresponding figures showing the outer surface of connector piece 109, i.e., the side facing away from the complementary connector piece.

Rods 102 (not shown in FIGS. 4-7) fit into contoured guides 114. To help secure rods 102 in place and in order to have full control of the precise span of the framework, it is preferable to include protruding members 116 sized and shaped so as to fit into holes (not shown) in rods 102 and thus fix rods 102 at a precise location.

Connector piece 109 also features an opening 118 near its central portion, through which one can insert a pole, rod or tube (not shown) to help support the structure and/or to serve as a supporting leg for the space partition. The pole rod or tube may feature a cushion (not shown) on its lowest extremity to effect a soft non-slip contact with the ground.

In an alternative embodiment, it may be desirable to include two sets, rather than a single set, of protruding members 116 so that rods 102 coming from both directions can be accommodated by a single connector 104. This feature is attractive wherever it is desired to span a large span between adjoining vertical members 101 and there is concern that long rods 102 may offer inadequate support.

In such a case it may be desirable to use two or more shorter rods 102 and connect adjoining rods through a connector 104, having two sets of protruding members 116, which is not in contact with either of vertical members 101. It may further be desirable to insert a pole or tube (not shown) through opening 118 and extend the pole or tube to the floor so that it serves to help anchor and support the structure.

Connector piece 109 also feature means for attaching two connector pieces 109 together. Any suitable means for attachment may be used. Fastener holes 120 of the type which may accommodate a nut and bolt, screw, or similar fastener, are shown in FIGS. 4-7.

Connector piece 109 also preferably features a pair of projections 122 which serve to ensure that connector 104 will not spontaneously disconnect from vertical member 101, as is explained below.

In addition, one or both of connector pieces 109 which form connector 104 may feature prongs 105 which are spaced and shaped so as to engage slits 112 in vertical members 101 and thereby determine the vertical position of the cross member.

Connector piece 109 also features screw holes 124 which can accommodate fasteners for use, for example, in connecting vertical member 101 to a horizontal member which covers the top of the framework.

The connection of connector 104 and vertical member 101 and details of a possible configuration of vertical member 101 can be seen in cross sectional views in FIGS. 8-11. Vertical member 101 features a track running substantially along the entire length of vertical member 101. The track is formed by a pair of parallel arms 140. Each arm 140 includes an inwardly directed catch 142 which is capable of engaging projections 122 of connector 104, preventing the spontaneous release of connector 104.

Vertical member 101 is punched so as to accommodate prongs 105. A cover piece 126 may be snap fitted to the outside of vertical member 101 in order to hide prongs 105 and slots 112 from view and create an aesthetically pleasing cover or jacked. Cover piece 126 is made to snap into place by virtue of its somewhat flexible catches 128 which engage notches 130 on the outside surface of vertical member 101. Vertical member 101 also includes a male attachment 132 and a female attachment 134 for direct or indirect attachment to adjoining members.

Figure 9:
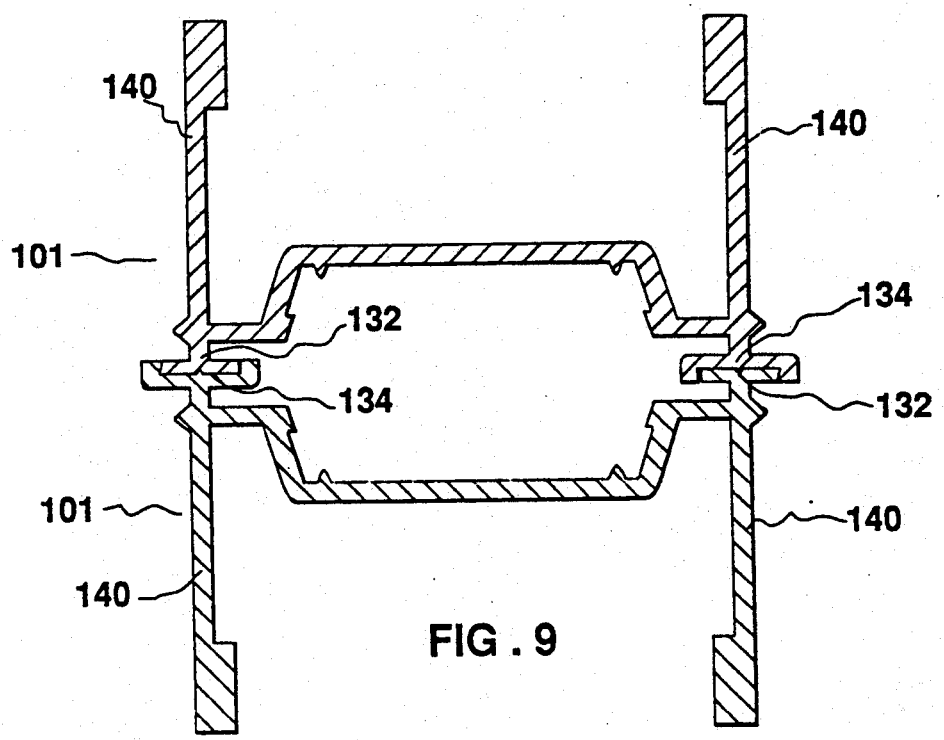
FIG. 9 is a cross sectional view of two vertical members connected to form a straight wall.
Figure 10:
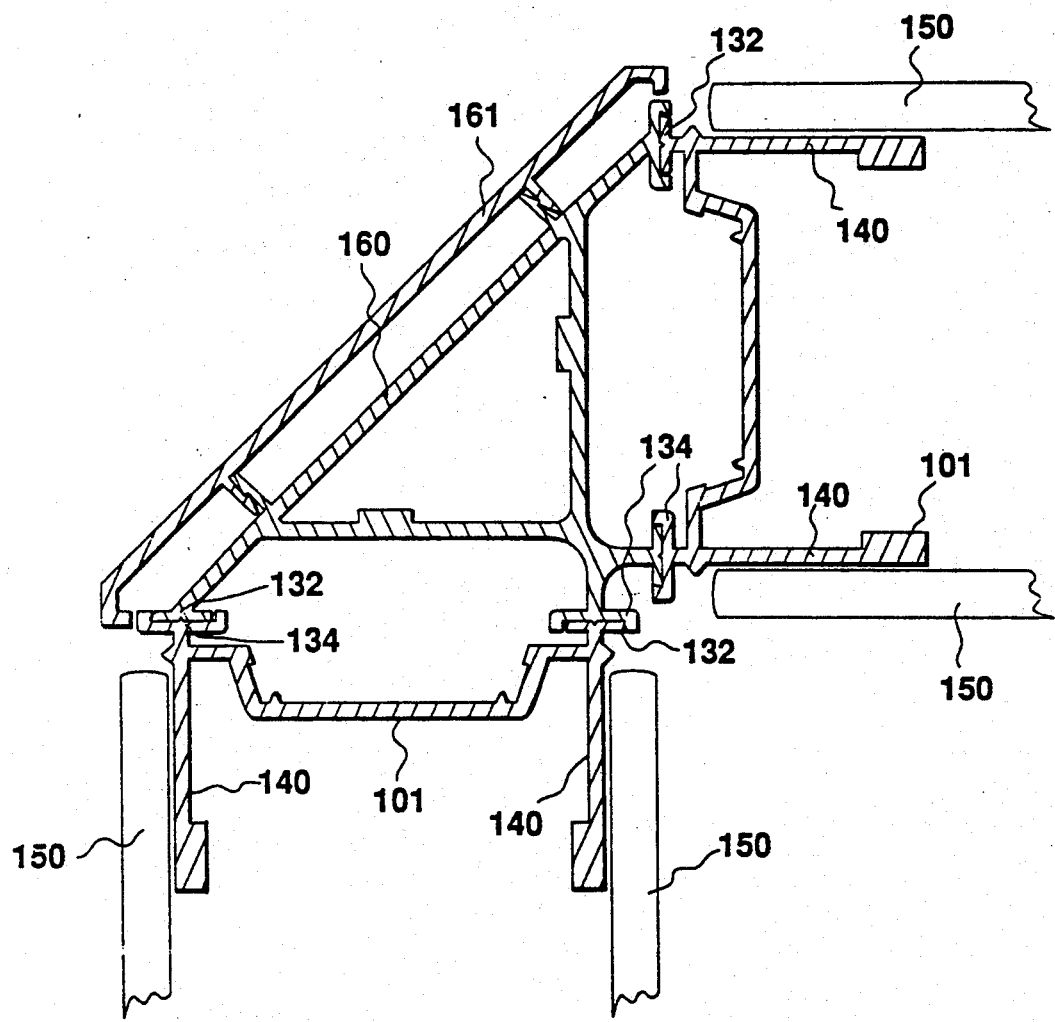
FIG. 10 is a cross sectional view of two vertical members connected through an adapter to form a right angle.
Figure 11:
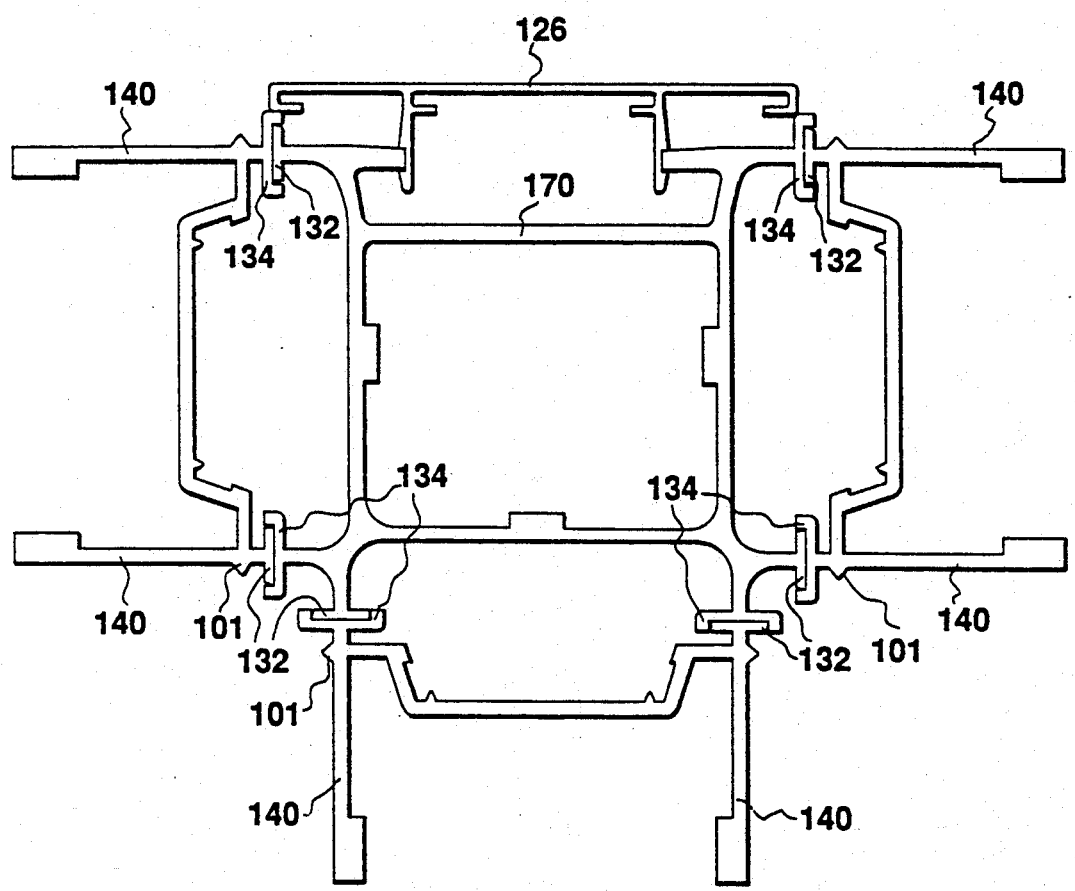
FIG. 11 is a cross sectional view of three vertical members connected through an adapter to form a straight wall and a right angle.

Several examples of such attachments are shown in FIGS. 9-11. In FIG. 9 is shown an attachment of two adjoining vertical members 101 to form one long wall. FIG. 10 shows a possible attachment of two adjoining vertical members 101 perpendicular to each other. This may be accomplished with the aid of a triangular adapter 160. A triangular adapter cover piece 161 can be used to cover the outside surface of triangular adapter 160 and give the corner a more aesthetically pleasing appearance.

Similarly, three vertical members 101 may be attached with two members forming a long wall and a third being perpendicular to the other two with the aid of a rectangular adapter 170 as shown in FIG. 11.

To complete the installation of a space partition, one would install decorative and/or acoustic panels 150, as is shown partially in FIG. 10. Decorative and/or acoustic panels 150 could be mounted in any convenient fashion. One possible method is through the use of two-pronged clips which attach around rods 102.

While the invention has been described with respect to several embodiments, it will be appreciated that many variations, modifications and other applications of the invention may be made.

What is claimed is:

1. A space partition framework, comprising:
    (a) a pair of vertical members; and
    (b) a cross member connecting said vertical members, said cross member including:
        (i) a pair of connectors, each of said connectors capable of engaging one of said vertical members; and
        (ii) a linking element connecting said connectors to each other, said linking element including a pair of parallel bars sufficiently separated as to accommodate the presence of electrical, telephone, communications or computer wires.

2. A framework as in claim 1 wherein said linking element includes a rod.

3. A framework as in claim 1 wherein said linking element is detachably connected to said connectors.

4. A framework as in claim 1 wherein said linking element includes a pair of cylindrical rods.

5. A framework as in claim 1 wherein said connectors are detachably connected to said vertical members.

6. A framework as in claim 1 wherein said connector includes two connector segments which can be fastened to each other so as to confine said linking element between them.

7. A framework as in claim 6 wherein said connector segments are fastened to each other with the aid of a screw.

8. A framework as in claim 6 wherein said linking element includes a hole near its end and wherein said connector includes a projecting pin capable of engaging said hole.

9. A framework as in claim 1 wherein each of said vertical members features a track having inwardly projecting lips and wherein each of said connectors features an outwardly extending projection capable of being snapped into place and of engaging said tracks in said vertical members.

10. A framework as in claim 1 wherein said connector features a vertically oriented opening through said connector capable of accommodating a pole.

11. A space partition, comprising:
(a) a supporting framework including
  (i) a pair of vertical members; and
  (ii) a cross member connecting said vertical members, said cross member including:
    (A) a pair of connectors, each of said connectors capable of engaging one of said vertical members; and
    (B) a linking element connecting said connectors to each other, said linking element including a pair of parallel bars sufficiently separated as to accommodate the presence of electrical, telephone, communications or computer wires; and
(b) a decorative panel mounted onto said framework.

12. A space partition framework, comprising:
(a) a pair of vertical members each of said vertical members featuring vertically spaced openings; and
(b) a cross member connecting said vertical members, said cross member including:
  (i) a pair of connectors, each of said connectors featuring an outwardly extending prong capable of engaging one of said spaced openings in said vertical members; and
  (ii) a linking element connecting said connectors to each other.

13. A framework as in claim 12 further comprising a covering member capable of engaging said vertical member so as to cover said prong and said openings from view.

* * * * *